(12) United States Patent
Haberek et al.

(10) Patent No.: US 7,214,876 B1
(45) Date of Patent: May 8, 2007

(54) QUICK GRIP ELECTRICAL BOX

(75) Inventors: Andrew M. Haberek, Minoa, NY (US); Richard M. Rohmer, Jordan, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

(21) Appl. No.: 11/159,432

(22) Filed: Jun. 21, 2005

(51) Int. Cl.
*H01H 9/02* (2006.01)

(52) U.S. Cl. .............................. 174/58; 174/50; 174/60; 174/135; 220/4.02

(58) Field of Classification Search ................. 174/50, 174/58, 60, 135; 220/3.2, 3.3, 4.02; 439/535
See application file for complete search history.

(56) References Cited

U.S. PATENT DOCUMENTS

| | | | |
|---|---|---|---|
| 3,724,795 A * | 4/1973 | Callanan ..................... | 248/682 |
| 3,977,640 A * | 8/1976 | Arnold et al. ............... | 248/542 |
| 5,841,068 A | 11/1998 | Umstead et al. | |
| 6,573,446 B1 | 6/2003 | Umstead et al. | |
| 6,914,187 B2 * | 7/2005 | Hull et al. .................... | 174/50 |
| 6,956,172 B2 * | 10/2005 | Dinh ............................ | 174/58 |
| 2006/0131047 A1 * | 6/2006 | Dinh et al. ................... | 174/58 |

* cited by examiner

*Primary Examiner*—Dhiru R. Patel
(74) *Attorney, Agent, or Firm*—Daniel P. Malley; Bond, Schoeneck & King PLLC

(57) ABSTRACT

The present invention is directed to an integrally molded wall box unit that includes an electrical box configured to receive at least one electrical device. The electrical box includes a front face portion configured to accommodate the at least one electrical device and an opposing back wall portion configured to accommodate electrical wiring. A gripper member includes a flange member, an arm member and a tooth member. The flange member is connected to a first side of the electrical box and extends outwardly in a direction substantially perpendicular to the first side. The arm member is connected to the flange member at a first end and extends in a direction substantially perpendicular to the flange member. The electrical box, the flange member, and the arm member are configured to receive a structural member disposed therebetween. The tooth member is disposed at a second end of the arm member. The tooth member extending in a direction toward the electrical box. The tooth member is configured to removably secure the unit to the structural member.

21 Claims, 4 Drawing Sheets

QUICK GRIP ELECTRICAL BOX

BACKGROUND OF THE INVENTION

1. Field of the Invention

The present invention relates generally to electrical wall boxes, and particularly to securing electrical wall boxes to structural members.

2. Technical Background

Electrical wall boxes are used in building construction to house electrical components such as GFCIs, switches, electrical outlets, and other such electrical devices. The electrical wall boxes are disposed within the walls of the structure by securing them to a structural component, such as a wall stud. On some occasions the structural component is a floor joist or ceiling joist. In one approach that has been considered, the wall box is secured to the structural element by a bracket of some sort.

A conventional electrical wall box may be secured to a wall stud, or other such structural member, by way of a flat or L-shaped bracket. The bracket itself is fastened to the stud by way of a hammer and nails. The electrical wall box may be attached to the bracket before or after the bracket is mounted. However, there is a drawback associated with the aforementioned brackets. The installer must hold the bracket against the stud with one hand, while at the same time, attempting to insert a nail into an opening in the bracket with the very same hand. Once the nail is in the opening, the other hand may be used to hammer the nail partially into place. Finally, the installer positions the bracket and finishes the task of securing the bracket to the wall stud or joist.

The aforementioned process is further complicated if the homeowner desires a "walkthrough" to review the electrical layout with the contractor during the rough-in phase of construction. Using conventional wall boxes, the contractor must place the box on the floor next to the wall stud. What is needed is a wall box that is equipped with a molded grip connected to the nailing flange for easy placement of the wall box.

SUMMARY OF THE INVENTION

The present invention addresses the needs described above. In particular, the present invention provides a wall box that includes a molded grip connected to the nailing flange. The molded grip allows a contractor to snap the wall box onto any stud. The wall box is easily removed and repositioned onto another wall stud. This feature allows the contractor to adjust the placement of wall boxes during the aforementioned walk through process. Further, the molded grip also allows the installer to snap the box onto the wall stud with out having to juggle the wall box and a nail in one hand in the manner described above.

One aspect of the present invention is an integrally formed wall box unit that includes an electrical box configured to receive at least one electrical device. The electrical box includes a front face portion configured to accommodate the at least one electrical device and at least one other wall portion configured to accommodate electrical wiring. A gripper member includes a flange member, an arm member and a tooth member. The flange member is connected to a first side of the electrical box and extends outwardly in a direction substantially perpendicular to the first side. The arm member is connected to the flange member and extends in a direction substantially perpendicular to the flange member. The electrical box, the flange member, and the arm member are configured to receive a structural member disposed therebetween. A tooth member is disposed on the arm member. The tooth member extends in a direction toward the electrical box. The tooth member is configured to removably secure the unit to the structural member.

In another aspect, the present invention is directed to an integrally formed wall box unit that includes an electrical box configured to receive at least one electrical device. The electrical box includes a front face portion configured to accommodate the at least one electrical device and at least one other wall portion configured to accommodate electrical wiring. A gripper member includes a flange member, an arm member and a tooth member. The flange member is connected to a first side of the electrical box and extends outwardly in a direction substantially perpendicular to the first side. The arm member is connected to the flange member and extends in a direction substantially perpendicular to the flange member. The electrical box, the flange member, and the arm member are configured to receive a structural member disposed therebetween. A tooth member is disposed at least one of the arm member, flange member or first side member. The tooth member extends in a direction toward the structural member. The tooth member is configured to removably secure the unit to the structural member.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Figure 1:
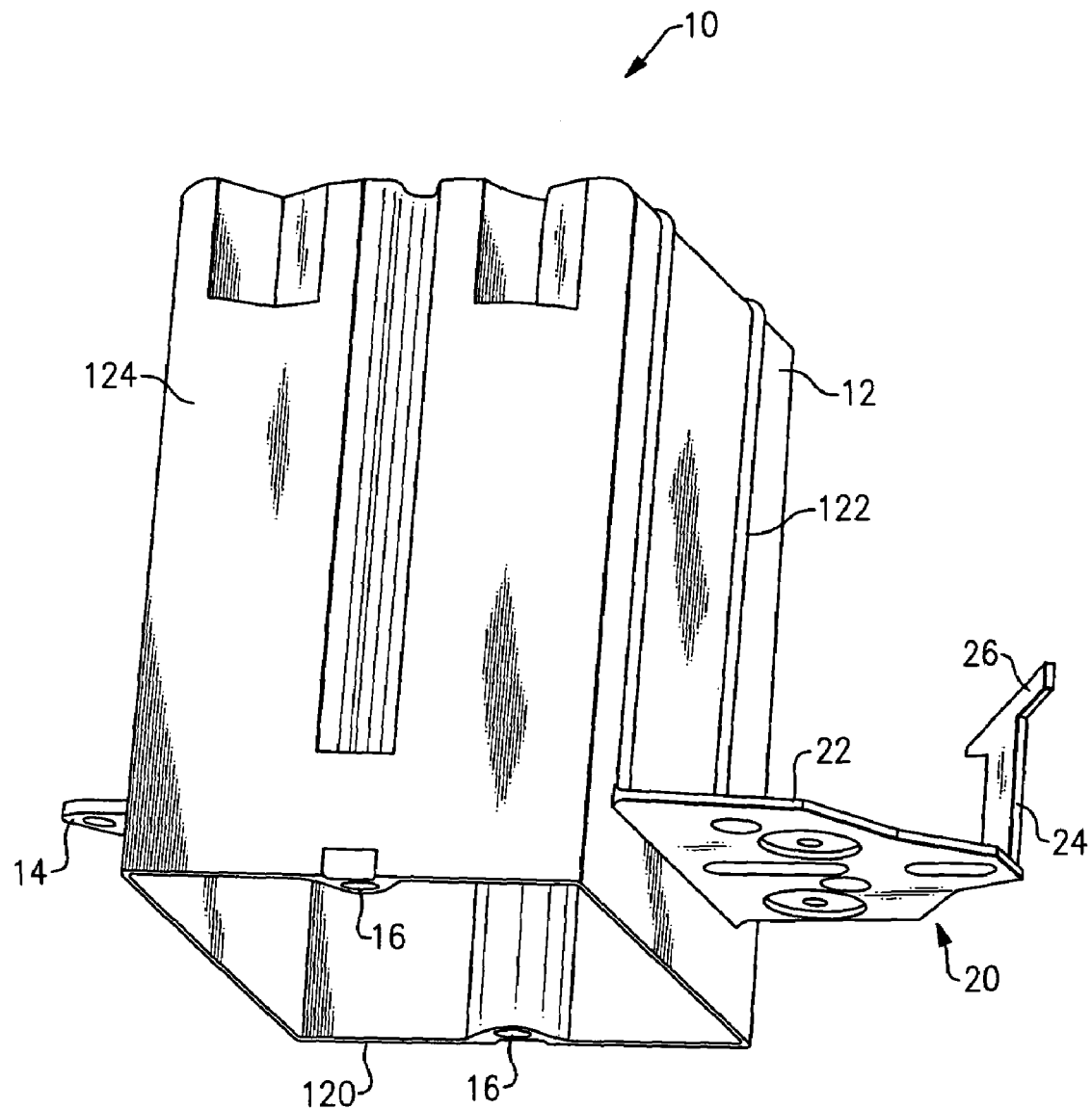
FIG. 1 is a perspective view of the wall box in accordance with the present invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the electrical wall box of the present invention is shown in FIG. 1, and is designated generally throughout by reference numeral 10.

As embodied herein, and depicted in FIG. 1, a perspective view of the wall box 10 in accordance with the present invention is disclosed. Wall box 10 is an integrally formed unit that includes an electrical box 12 and a gripper member 20. The electrical box includes a front face portion 120 that is configured to accommodate an electrical device (not shown). The electrical device is mounted to front face 120 by fasteners that inserted into openings 16. The gripper member 20 includes a flange member 22, an arm member 24, and a tooth member 26. The flange member 22 is connected to a side 122 of electrical box 12 at a predetermined distance from the front face portion, the predetermined distance typically being one-half inch. Flange 22 extends outwardly in a direction substantially perpendicular to the side 122. Arm member 24 is connected to flange member 22 at one end and extends in a direction substantially perpendicular to the flange member 22. Tooth member 26 is disposed at the distal end (relative to flange member 22) of arm member 24. Tooth member 26, as shown, is extends generally in a direction toward electrical box 12. Those skilled in the art will recognize that tooth 26 may be of any suitable shape. Tooth member 26 is configured to secure unit 10 to a structural member. Electrical box 12, flange member 22, and arm member 24 form a rectangular space that is configured to accommodate and receive a structural member such as a wall stud. FIG. 1 also shows a lateral stabilizing flange 14, which is described in more detail below.

It will be apparent to those of ordinary skill in the pertinent art that integrally formed wall box unit 10 may be manufactured using a variety of materials and manufacturing techniques. For example, the integrally formed wall box unit is formed by a injection molding process or a casting process. The integrally formed wall box unit may be formed using any suitable material including, but not limited to, resinous materials, plastic materials, thermoplastic materials, thermoset materials, or metallic materials.

Figure 2A:
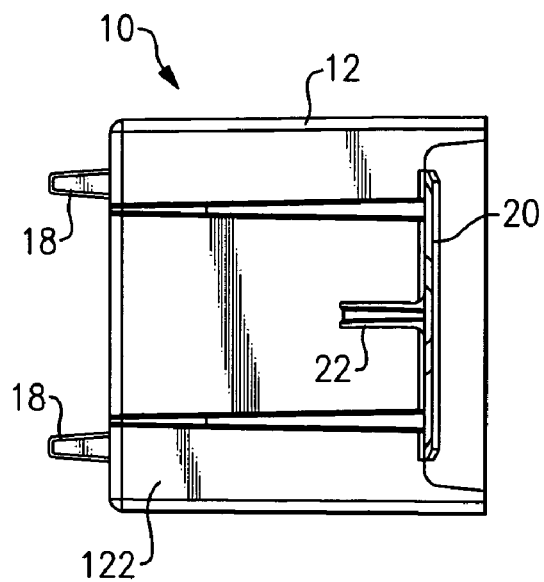
FIG. 2A is a side elevation view of the wall box depicted in FIG. 1.
Figure 2B:
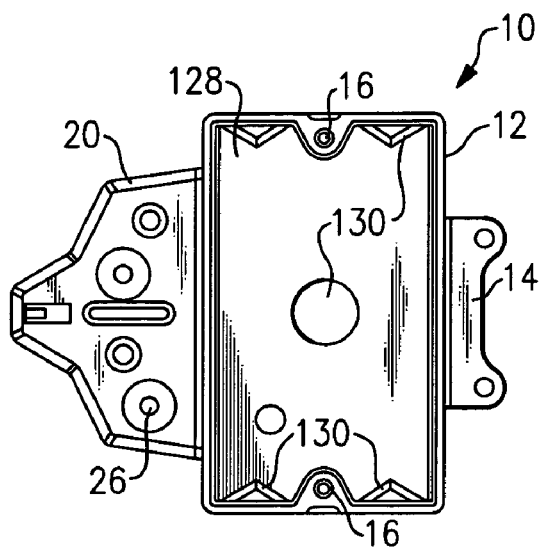
FIG. 2B is a view of the front face portion of the wall box depicted in FIG. 1.
Figure 2C:
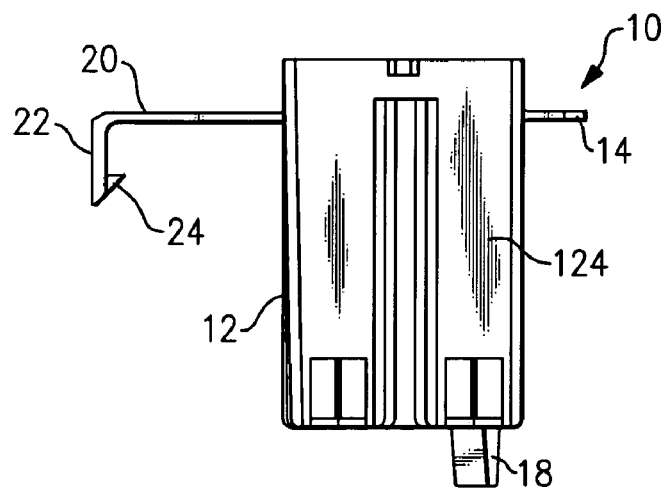
FIG. 2C is a view of a top surface of the wall box depicted in FIG. 1.

Referring to FIGS. 2A–2C, various views of wall box 10 are shown. FIG. 2C shows a side elevation view of the wall box 10, featuring side 122. Of particular interest in this view is the presence of rear stabilizers 18. The distance between front face 120 and the distal end of rear stabilizers 18 is approximately equal to width of the structural member. Accordingly, if a user applies force to the front face 120, rear stabilizers 18 will press against a rear wall member. As such, the device will not tend to rotate about flange 20. FIG. 2B is a view of the front face portion of the wall box 10. In this view rear wall 128 is shown to include a knock out portion 130. When knock-out portion 130 is removed, an opening for accommodating electrical wiring is revealed. FIG. 2C is a view of a top surface 124 of the wall box 10. As shown in this view, lateral stabilizer 14 and flange 20 are shown to be recessed a predetermined distance from the face portion 120. As noted above, this distance is approximately equal to one-half inch. Both of these features are recessed to accommodate sheet rock after the installation of wall box 10.

Figure 3:
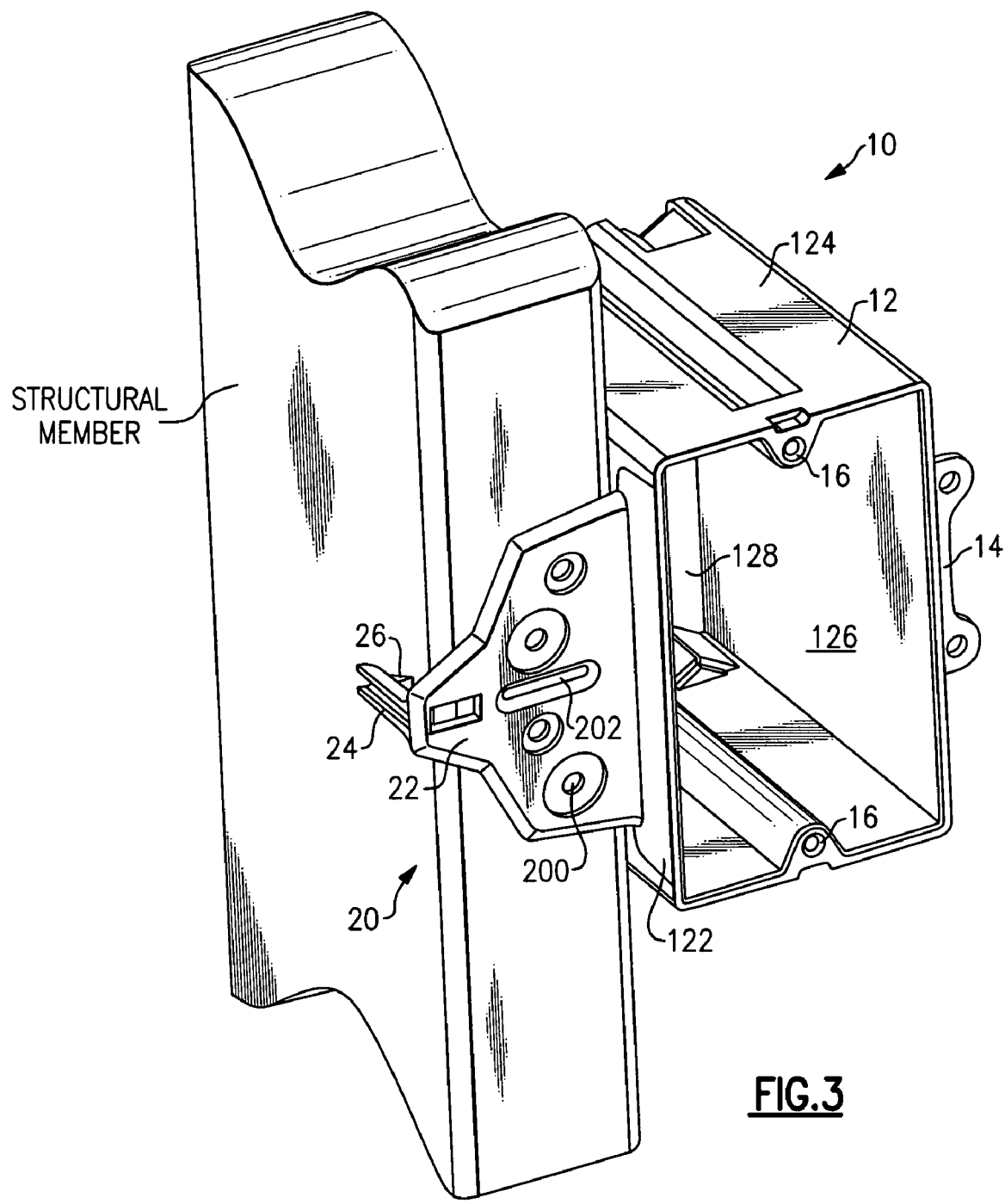
FIG. 3 is a perspective view showing the wall box secured to a structural member.

Referring to FIG. 3, a perspective view showing the wall box 10 secured to a stud is shown. Note that flange 20 includes fastener openings 200 and positioning slot 202. The positioning slot allows the user to mark the wall stud with a pencil to determine the vertical position of wall box 10. At this point, the user may apply pressure to tooth member 26. The tooth member 26 secures the unit 10 to the stud until a fastener (nail) is inserted into openings 200. In an alternative embodiment, tooth member 26 includes a plurality of tooth members. In an alternative embodiment, tooth member 26 is disposed on the side 122, flange 22, and/or arm member 24.

Molded grip 20 allows the installer to snap the box onto the wall stud without having to juggle the wall box and a nail in one hand in the manner described in the Background portion of the Specification.

Further, grip member 20 also allows a user to move and repositioned wall box 10 onto another wall stud with relative ease. This feature allows the contractor to adjust the placement of wall boxes during the walk-through process described in the Background portion of the Specification. Tooth member 26 allows unit 10 to be snapped, removed, and re-snapped into place on the structural member.

Figure 4:
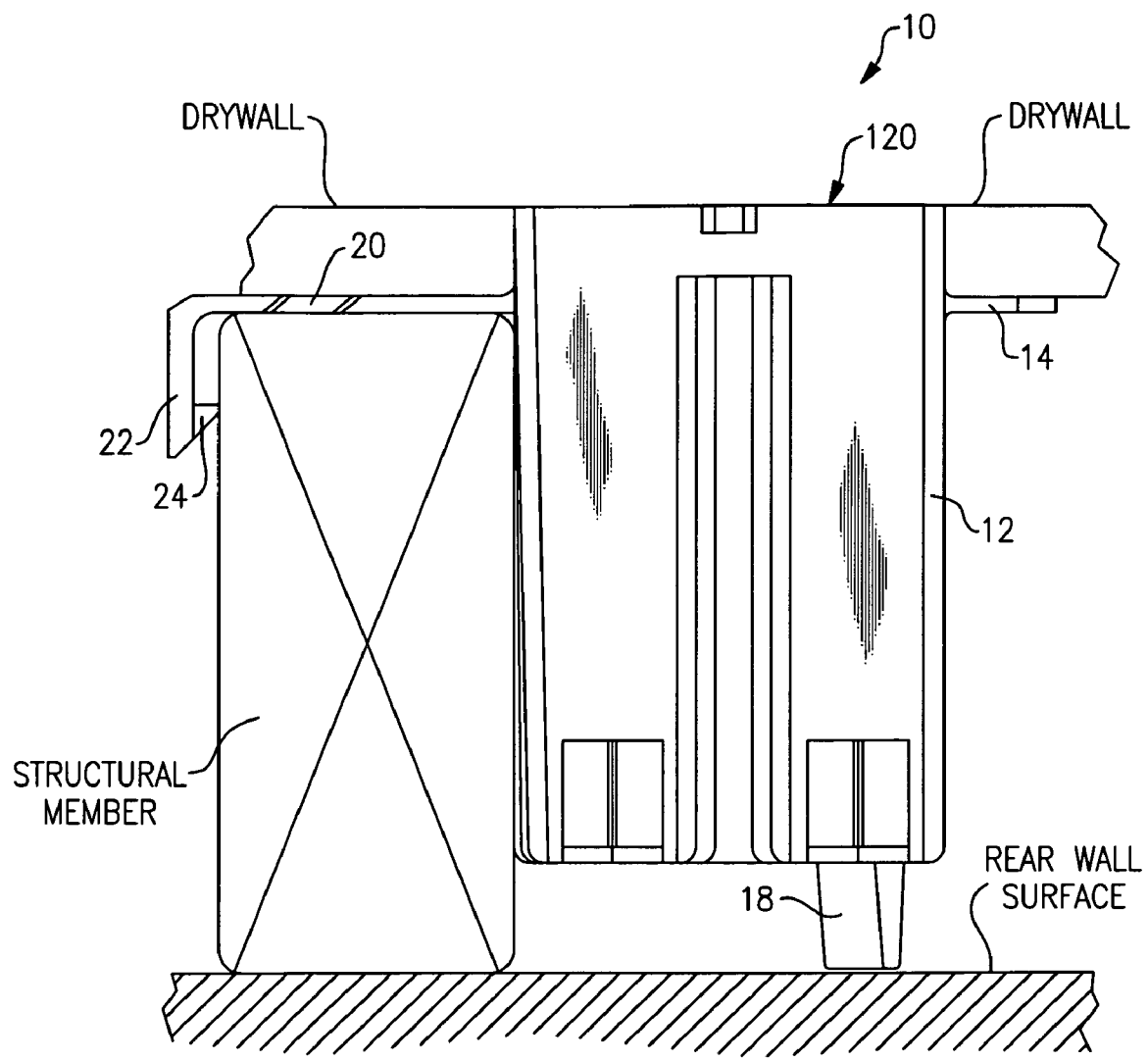
FIG. 4 is a plan view showing the wall box secured to a structural member.

FIG. 4 is a plan view showing the wall box 10 secured to a structural member (wall stud). Again, note that grip member 20 and lateral stabilizer 14 are recessed to accommodate sheet rock. After installation, the front face portion 120 is substantially flush with the exterior surface of the drywall. A user may place a portion of a 2×4 behind lateral stabilizer 14 for added support and stability (not shown). Finally, note also that the distal end portion of rear stabilizer 18 abuts, or is in close proximity to, the rear wall surface. Accordingly, wall box 10 provides a stable platform for mounting electrical devices.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. An integrally formed wall box unit comprising:
   an electrical box configured to receive at least one electrical device, the electrical box including a front face portion configured to accommodate the at least one electrical device and at least one other wall portion configured to accommodate electrical wiring; and
   a gripper member including a flange member, an arm member and a tooth member, the flange member being connected to a first side of the electrical box and extending outwardly in a direction substantially perpendicular to the first side, the arm member being connected to the flange member and extending from the flange member, the electrical box, the flange member, and the arm member being configured to receive a structural member disposed therebetween, and the tooth member being disposed on the arm member, the tooth member extending in a direction toward the electrical box, the tooth member being configured to removably secure the unit to the structural member.

2. The unit of claim 1, wherein the flange is connected to the electrical box at a predetermined distance from the front face portion such that a finished wall surface is substantially flush with the front face portion.

3. The unit of claim 2, wherein the predetermined distance is approximately one-half inch.

4. The unit of claim 1, wherein the front face portion includes a plurality of openings for mounting the at least one electrical device to the electrical box.

5. The unit of claim 1, wherein the flange member includes a plurality of fastener openings, each of the plurality of openings being configured to accommodate a fastener for securing the flange member to the structural member.

6. The unit of claim 1, further comprising a stabilizing leg connected to the back wall portion, the stabilizing leg extending in a direction substantially perpendicular to the back wall portion.

7. The unit of claim 6, wherein a dimension extending from a back surface of the flange member to a distal end of the stabilizing leg is substantially equal to a width of the structural member.

8. The unit of claim 7, wherein the dimension is selected to accommodate a 2×4 wall stud.

9. The unit of claim 1, further comprising a stabilizer flange extending outwardly in a direction substantially perpendicular to a second side surface of the electrical box, the first side and the second side being parallel and opposing sides of the electrical box.

10. The unit of claim 9, wherein the stabilizer flange is connected to the electrical box at a predetermined distance from the front face portion such that a finished wall surface is substantially flush with the front face portion.

11. The unit of claim 10, wherein the predetermined distance is approximately one-half inch.

12. The unit of claim 1, wherein the tooth member includes a tooth configured to extend toward the first side of the electrical box and removably secure the unit to the structural member when the structural member is received by the first side, the flange member and the arm member.

13. The unit of claim 12, wherein the arm member is configured to flex when the structural member is received by the first side, the flange member and the arm member.

14. The unit of claim 1, wherein the integrally formed wall box unit is formed by a casting process.

15. The unit of claim 1, wherein the integrally formed wall box unit is formed by a injection molding process.

16. The unit of claim 1, wherein the integrally formed wall box unit is comprised of a plastic resin material.

17. The unit of claim 1, wherein the integrally formed wall box unit is comprised of a thermoplastic material.

18. The unit of claim 1, wherein the integrally formed wall box unit is comprised of a thermoset material.

19. The unit of claim 1, wherein the integrally formed wall box unit is comprised of a metallic material.

20. The unit of claim 1, wherein the flange member includes a slotted opening.

21. An integrally formed wall box unit comprising:

an electrical box configured to receive at least one electrical device, the electrical box including a front face portion configured to accommodate the at least one electrical device and at least one other wall portion configured to accommodate electrical wiring; and a gripper member including a flange member, an arm member and a tooth member, the flange member being connected to a first side of the electrical box and extending outwardly in a direction substantially perpendicular to the first side, the arm member being connected to the flange member and extending from the flange member, the electrical box, the flange member, and the arm member being configured to receive a structural member disposed therebetween, and the tooth member being disposed in at least one of the arm member, flange member, or first side wall, the tooth member extending in a direction toward the structural member, the tooth member being configured to removably secure the unit to the structural member.

* * * * *